United States Patent
Greiner et al.

(10) Patent No.: US 9,162,627 B2
(45) Date of Patent: Oct. 20, 2015

(54) SNUG-FIT ITEM HOLDER

(71) Applicant: Ford Global Technologies, LLC, Dearborn, MI (US)

(72) Inventors: Josh Greiner, Detroit, MI (US); Annette Lynn Huebner, White Lake, MI (US); Ryan Welch, Ottawa Lake, MI (US); Kristin Ann Hellman, Walled Lake, MI (US); Artur Sakarian, Birmingham, MI (US); Scott H. Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/155,603

(22) Filed: Jan. 15, 2014

(65) Prior Publication Data

US 2015/0197201 A1 Jul. 16, 2015

(51) Int. Cl.
| | |
|---|---|
| *B60R 7/08* | (2006.01) |
| *B60R 7/04* | (2006.01) |
| *B60N 3/08* | (2006.01) |
| *E05B 83/32* | (2014.01) |
| *B60N 3/10* | (2006.01) |
| *B60N 2/46* | (2006.01) |
| *B60R 11/00* | (2006.01) |
| *B60R 13/02* | (2006.01) |

(52) U.S. Cl.
CPC ... *B60R 7/08* (2013.01); *B60R 7/04* (2013.01); *B60N 2/46* (2013.01); *B60N 2/4686* (2013.01); *B60N 3/08* (2013.01); *B60N 3/102* (2013.01); *B60R 11/00* (2013.01); *B60R 13/0262* (2013.01); *B60R 2011/0007* (2013.01); *E05B 83/32* (2013.01)

(58) Field of Classification Search
CPC ............ B60R 2011/0007; B60R 11/00; B60R 13/0262; B60R 7/08; B60R 7/04; B60N 2/4686; B60N 2/46; B60N 3/102; B60N 3/08; E05B 83/32
USPC ..................... 296/24.34, 37.8, 37.1
See application file for complete search history.

(56) References Cited

U.S. PATENT DOCUMENTS

| | | | |
|---|---|---|---|
| 499,264 A | 6/1893 | Troescher | |
| 1,681,755 A | 8/1928 | Warner et al. | |
| 1,960,073 A | 5/1934 | Warner | |
| 4,282,975 A | 8/1981 | Ovadia | |
| 5,826,711 A | 10/1998 | Ovadia | |
| 6,059,115 A | 5/2000 | Ovadia | |
| 8,246,097 B2 * | 8/2012 | Beyer | ......................... 296/24.34 |
| 2007/0119885 A1 * | 5/2007 | Miller et al. | .................. 224/275 |

FOREIGN PATENT DOCUMENTS

EP 1345186 A1 9/2003

* cited by examiner

*Primary Examiner* — Joseph D Pape
*Assistant Examiner* — Dana Ivey
(74) *Attorney, Agent, or Firm* — Vichit Chea; Price Heneveld LLP

(57) ABSTRACT

An item holder for a vehicle interior includes first and second retention members which are operable between at-rest and recessed positions relative to one another. The first and second retention members have edge portions which are generally arranged in a parallel relationship and define a spacing therebetween for the insertion of an item in use. An item stored in the item holder is retained by the first and second retention members in that the first and second retention members are biased towards the at-rest position for engagement of an item therebetween. The item holder provides ready access to personal items as stored therein by a vehicle occupant.

20 Claims, 4 Drawing Sheets

SNUG-FIT ITEM HOLDER

FIELD OF THE INVENTION

The present invention generally relates to an item holder for a vehicle interior, and more specifically, to an item holder having deformable retention members which are adapted to hold an item in a friction fit manner therebetween.

BACKGROUND OF THE INVENTION

Vehicle occupants are often seeking convenient locations within a vehicle interior to place and retain smaller personal items, such as phones, pens, notepads, parking slips, cards and other chattel such as portable electronic devices. In current vehicle interiors, these small personal items are usually stored in a cup-holder or shallow open bin in a vehicle interior trim, console, or instrument panel, where they are insufficiently retained, and thus are subject to moving around, vibrating, and making noise as the vehicle is driven and maneuvered. Further, these items can be ejected from a small storage bin having an open top or a cup holder during the maneuvering of the vehicle.

Thus, it is desirable to provide an item holder in a dedicated location for storing and retaining small personal items in such a manner that the items are securely in place while maneuvering the vehicle and conveniently located in close proximity to the vehicle occupant for easy retrieval.

SUMMARY OF THE INVENTION

One aspect of the present invention includes, an item holder for a vehicle interior, wherein the item holder includes first and second retention members. The first and second retention members have deformable edge portions which are arranged in a generally parallel relationship. The edge portions are operable between at-rest and recessed positions. A biasing mechanism biases the edge portions towards the at-rest position. An opening is defined between the edge portions of the first and second retention members and is adapted to receive an item for holding in the item holder by abutment with each of the edge portions of the first and second retention members.

Another aspect of the present invention includes, an item holder for a vehicle interior having first and second retention members. The first and second retention members have edge portions which are generally arranged in a parallel relationship. The edge portions are operable between an at-rest position and a parted position. In the at-rest position, the edge portions abut one another along an abutment line. In the parted position, a spacing is defined between the edge portions of the first and second retention members. The edge portions are biased towards the at-rest position for retaining an item received therebetween.

Yet another aspect of the present invention includes, an item holder for a vehicle interior which includes a console divided into first and second storage bins by a divider. The divider includes first and second divider walls defining a storage area therebetween. First and second retention members are disposed on the first and second divider walls at upper portions thereof. The first and second retention members are operable between at-rest and recessed positions in assembly. A biasing mechanism biases the first and second retention members towards the at-rest position for retaining an item received therebetween.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
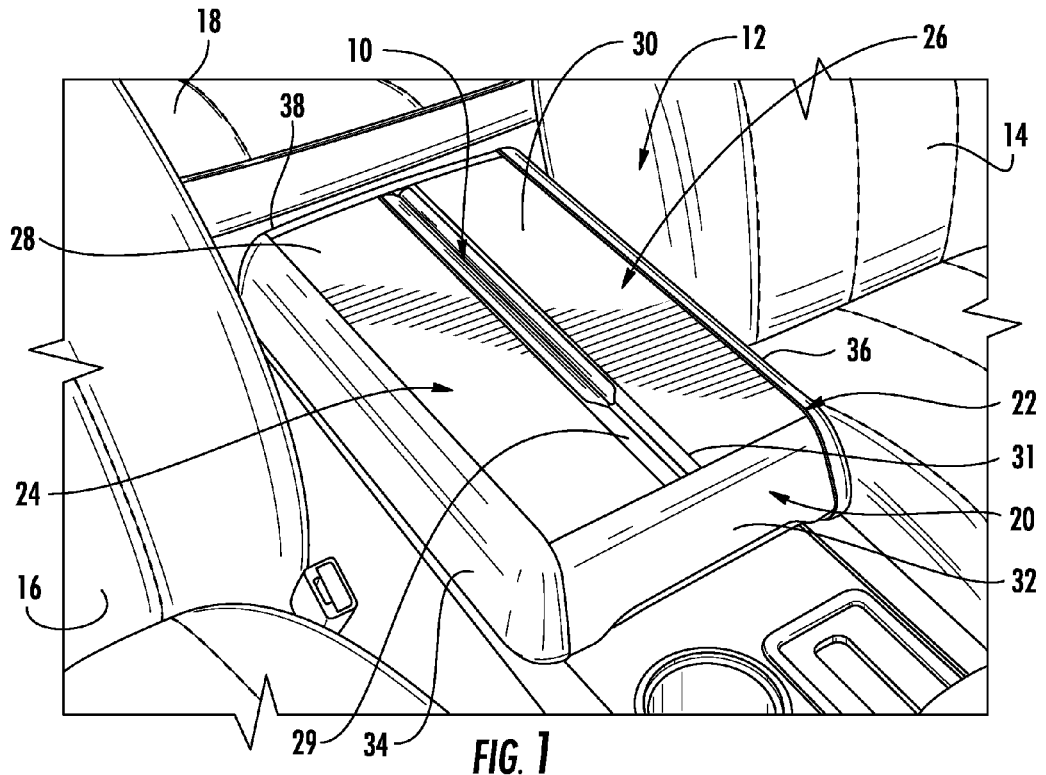
FIG. 1 is a perspective view of a vehicle interior having a center console including an item holder.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates an item holder disposed within a vehicle interior 12. The vehicle interior 12 includes a driver seat 14 and a passenger seat 16 with a rear seat 18. As further shown in FIG. 1, a console assembly 20 is generally centrally disposed between the driver seat 14 and the passenger seat 16 in a car-forward position relative to the rear seat 18. The item holder 10, as shown in FIG. 1, is centrally disposed on a storage compartment 22 in the console assembly 20, wherein the storage compartment 22 includes first and second storage bins 24, 26 having associated doors 28, 30 which are shown in FIG. 1 in a closed position. The first and second storage bins 24, 26 are disposed on opposite sides of the item holder 10, such that the item holder 10 is centrally located on the storage compartment 22. The storage compartment 22 generally includes a front wall 32, side walls 34, 36 and a rear wall 38, thereby generally defining a rectangular-shaped storage compartment 22. The compartment doors 28, 30 further include tab portions 29, 31 which are adapted to be engaged by the vehicle occupant for moving the doors 28, 30 between open and closed positions.

Figure 2:
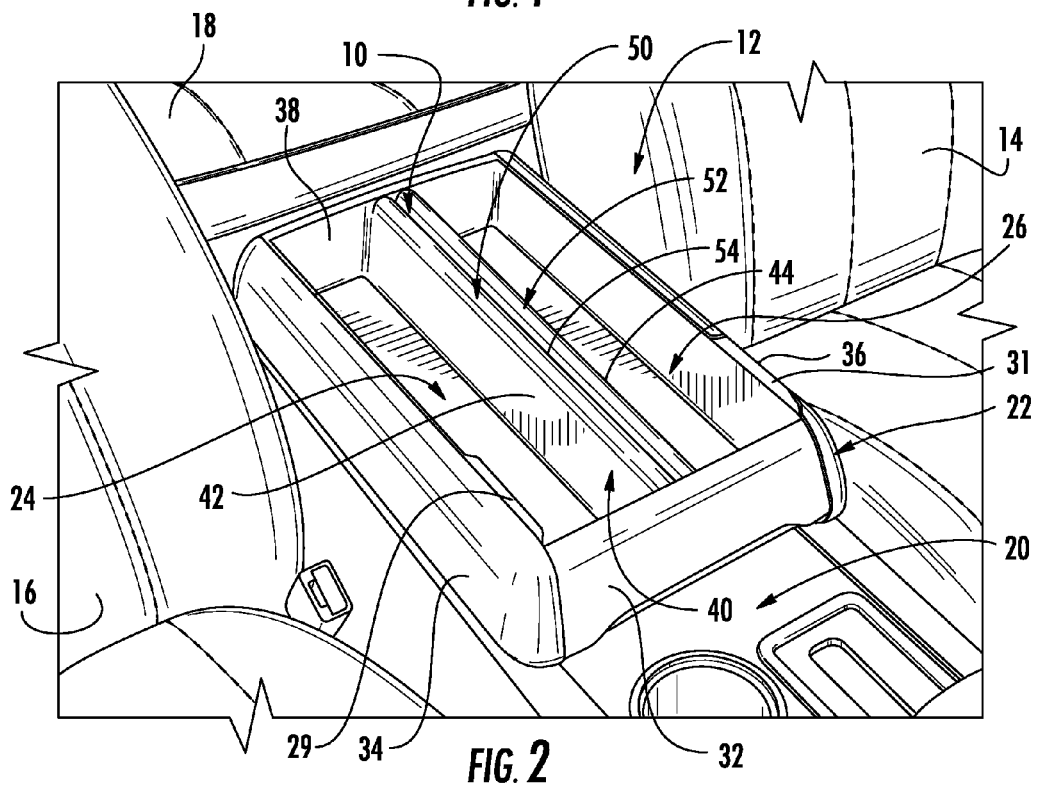
FIG. 2 is a perspective view of the vehicle interior of FIG. 1 showing the item holder in an open console.

Referring now to FIG. 2, the storage compartment 22 is shown with the doors 28, 30 in an open position, thereby allowing access to the first and second storage bins 24, 26. In the embodiment shown in FIG. 2, the doors 28, 30 recess into the side walls 34, 36, respectively, while the tab portions 29, 31 of the doors 28, 30 are disposed above the side walls 34, 36 for ready engagement by the vehicle occupant. As further shown in FIG. 2, the storage compartment 22 is divided into storage bins 24, 26 by a divider 40 which is generally defined by first and second divider walls 42, 44. The item holder 10 is generally defined, in this embodiment, by the divider walls 42, 44 and includes first and second retention members 50, 52 disposed on an upper portion of the divider walls 42, 44.

Figure 3:
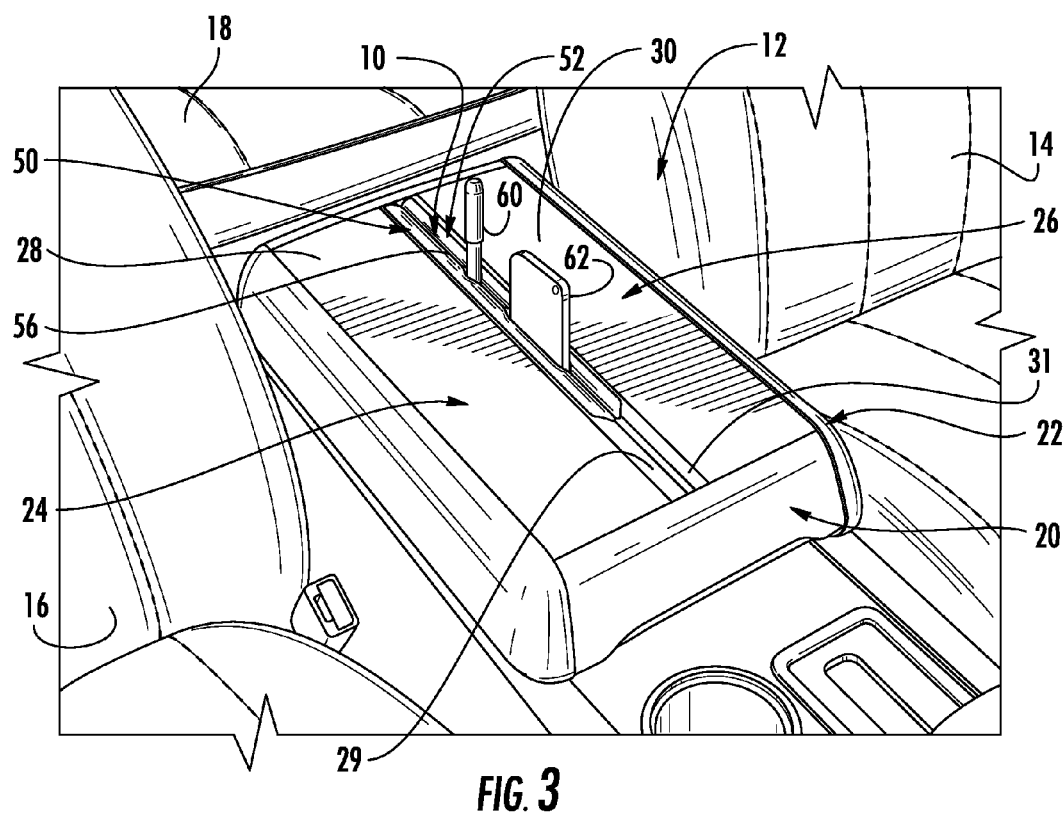
FIG. 3 is a perspective view of the vehicle interior of FIG. 1 showing the item holder having a number of items retained therein.

Referring now to FIG. 3, the storage compartment 22 is shown having the doors 28, 30 in the closed position and items 60, 62 are retained within the item holder 10. In the embodiment shown in FIG. 3, the item holder 10 includes first and second retention members 50, 52 which are disposed generally parallel and adjacent to one another, such that the retention members 50, 52 abut one another along an abutment line 56. As further described below, the first and second retention members 50, 52 include edge portions which are flexibly resilient to allow an item to be urged between the edge portions of each retention member 50, 52 and resiliently retained by the retention members 50, 52 once in place. The retention members 50, 52 may also include biasing mechanisms which help to ensure proper and secure retention of an item stored in the item holder 10. As shown in FIG. 3, items 60, 62 generally represent a pen and a portable electronic device, such as a phone, respectively.

Figure 4:
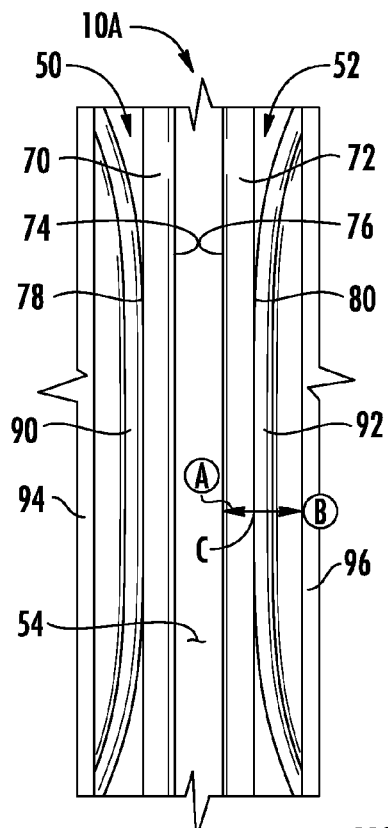
FIG. 4 is a fragmentary top plan view of a biasing mechanism for an item holder.

Referring now to FIG. 4, the first and second retention members 50, 52 of item holder 10A are shown in a generally parallel spaced-apart relationship and include a gap or spacing 54 defined therebetween for receiving an item to be retained in the embodiment of item holder 10A. The gap or spacing 54 is defined by edge portions 70, 72 of the first and second retention members 50, 52, which may include a foam-like core lined with a durable material such as cloth or leather, as further described below. When the edge portions 70, 72 comprise a foam-like core, the edge portions 70, 72 are flexibly resilient or deformable, such that the edge portions 70, 72 themselves can be deformed by a force applied thereto during the insertion of an item into the spacing 54 defined between the retention members 50, 52. The resiliency of the edge portions 70, 72 provides for a friction-fit retention of an item stored therebetween. As further shown in FIG. 4, the edge portions 70, 72 include innermost surfaces 74, 76 and outermost surfaces 78, 80 respectively. In use, the innermost surfaces 74, 76 are adapted to abut and retain an item as inserted in the spacing 54 therebetween. In the embodiment shown in FIG. 4, the outermost surfaces 78, 80 abut biasing mechanisms in the form of leaf springs 90, 92. The leaf springs 90, 92 abut the edge portions 70, 72 at the outermost surfaces 78, 80 and further abut reinforcement members 94, 96 disposed within the first and second retention members 50, 52 respectively. In this way, the biasing mechanisms 90, 92 bias the edge portions 70, 72 of the retention members 50, 52 inwardly towards one another and towards the at-rest position. Thus, each retention member 50, 52, as shown in FIG. 4, includes a biasing mechanism 90, 92, however, it is contemplated that one retention member alone may house a biasing mechanism. In the embodiment shown in FIG. 4, the first and second retention members 50, 52 are in an at-rest position A and are adapted to move to a recessed position B along a path as indicated by arrow C. In this way, the first and second retention members 50, 52 are deformable or moveable, and therefore operable between at-rest and recessed positions A, B. For example, as an item is inserted into the item holder 10A, the item will generally be placed in the spacing 54 between the edge portions 70, 72 of the first and second retention members 50, 52, or along the abutment line 56 as shown in FIG. 3. As the item is urged between the edge portions 70, 72 of the retention members 50, 52, the edge portions 70, 72 may deform, if a foam-like core is disposed therein, or when used with a rigid edge portion 70, 72 the first and second retention members 50, 52 themselves can move or part to the recessed position B along a path indicated by arrow C to allow for insertion of an item into the item holder 10A. In the recessed or parted position, the first and second retention members 50, 52 are parted or separated from one another, thereby overcoming the inward force of the biasing leaf springs 90, 92. Thus, the leaf springs 90, 92 define a biasing mechanism biasing the first and second retention members 50, 52 inwards to the at-rest position A shown in FIG. 4. Further, the leaf springs 90, 92 are loaded as the first and second retention members 50, 52 move to the recessed position B during the insertion of an item. Biasing the first and second retention members 50, 52 to the at-rest position A, the leaf springs 90, 92 provide for a secure engagement of an item stored within the item holder 10A as the inward force provided thereby helps to retain the item in an engaged position as further described below with reference to FIG. 6B.

As noted above, the item holder 10A may include a biasing mechanism, such as the leaf springs 90, 92, shown in FIG. 4, or may include deformable edge portions 70, 72 of the retention members 50, 52 that alone can deform for storing and retaining an item therebetween. It is further contemplated that the edge portions 70, 72 can be deformable with a compressible foam-like core, while the first and second retention members 50, 52 are also moveable between at-rest and recessed positions as described above. While the embodiment shown in FIG. 4 includes a spacing 54 between the inner surfaces 74, 76 of the retention members 50, 52, it is contemplated that the retention members 50, 52 can be positioned such that the inner surfaces 74, 76 abut one another along an abutment line, such as abutment line 56 shown in FIG. 3. When the edge portions 70, 72 of the retention members 50, 52 abut one another, there is no opening, such as opening 54 shown in FIG. 4, between the edge portions 70, 72 of the first and second retention members 50, 52. When the edge portions 70, 72 abut one another along an abutment line, the item holder 10 may be suitable for holding small items, such as a parking slip or credit card. Further, the opening 54, as shown in FIG. 4, between the first and second retention members 50, 52 can be varied in width depending on the desired vehicle design for meeting specific storage capacity requirements. Any number of biasing mechanisms can be used in conjunction with the present invention as further described below with specific reference to FIGS. 5A and 5B.

Figure 5A:
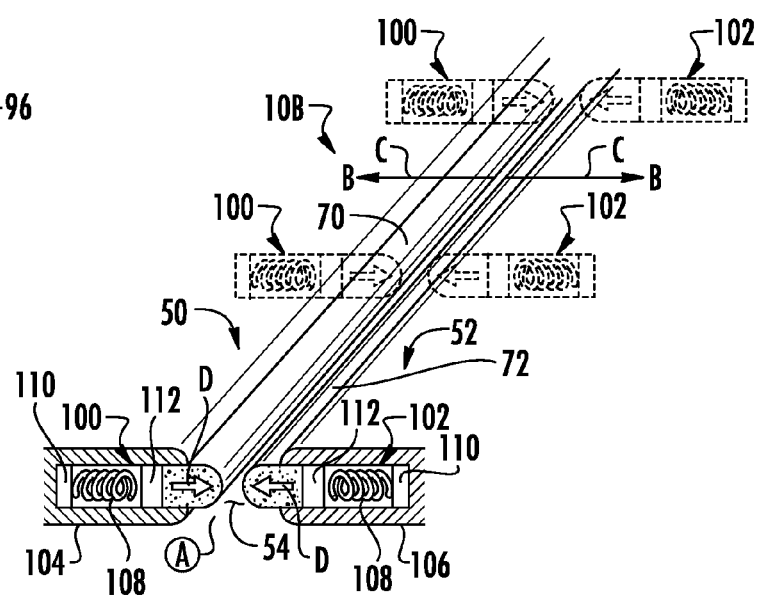
FIG. 5A is a perspective view of a biasing mechanism for an item holder.

Referring now to FIG. 5A, another embodiment of an item holder 10B is shown having a plurality of biasing mechanisms 100, 102 disposed within first and second retention members 50, 52 respectively. As shown in FIG. 5A, the first and second retention members 50, 52 generally include an outer housing portion 104, 106 in which the biasing mechanisms 100, 102 are disposed. Each biasing mechanism 100, 102 includes a coil spring 108 which generally abuts reinforcement members 110, 112 on opposite sides thereof. The coil springs may be made from a metal or polymeric material. Reinforcement member 110 is an outermost reinforcement member, while reinforcement 112 is an innermost reinforcement member within the biasing mechanisms 100, 102. In assembly, the inner reinforcement members 112 are coupled to the edge portions 70, 72 of the retention members 50, 52. In abutment with the coil spring 108, the innermost reinforcement members 112, along with the edge portions 70, 72 as coupled thereto, are adapted to move or otherwise slide inwardly into the housing 104 or 106 to move the edge portions 70, 72 to the recessed position B along a path as indicated by arrow C. The movement to the recessed position B of the edge portion 70, 72 is generally undertaken by a force imparted on the edge portions 70, 72 by an item being inserted into the spacing 54 disposed between the edge portions 70, 72 as the item is stored within the item holder 10B. As the item is inserted into the item holder 10B, the coil springs 108 are loaded and are adapted to move or bias the edge portions 70, 72 of the retention members 50, 52 to the at-rest position A along a path as indicated by arrow D. It is contemplated that any number of biasing mechanisms 100, 102 can be disposed along a length of either the first or second retention members 50, 52 to ensure proper engagement of an item as retained within the item holder 10B.

Figure 5B:
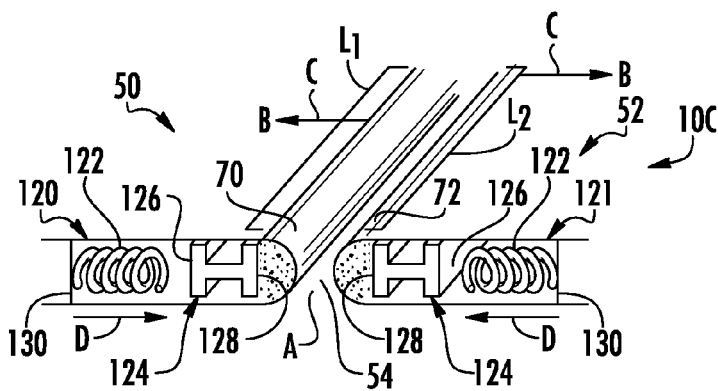
FIG. 5B is a perspective view of a biasing mechanism for an item holder.

Referring now to FIG. 5B, another embodiment of a biasing mechanisms 120, 121 is shown. The biasing mechanisms 120, 121 include a coil spring 122 that is adapted to abut a rigid reinforcement member 124. The rigid reinforcement member 124 is a stiff structural backer that is adapted to run the length of the retention members 50, 52 as designated by reference letters $L_1$ and $L_2$ and is further coupled to the edge portions 70, 72 of the retention members 50, 52 The rigid reinforcement member 124, in the embodiment shown in FIG. 5B, is a generally H-shaped reinforcement member having an innermost surface 128 and an outermost surface 126. The coil spring 122 abuts the outermost surface 126 of the rigid reinforcement member 124 at a first end and further abuts a backing member 130 on an opposite second end thereof. In this way, the edge portions 70, 72 of the retention members 50, 52 are adapted to move outward from the at-rest position A to the recessed position B on a path as indicated by arrow C. The movement from the at-rest position A to the recessed position B loads the coil springs 122 such that a force D is applied to the rigid reinforcement members 124, thereby biasing the edge portions 70, 72 of the retention members 50, 52 to the at-rest position A for the retention of an item retained therebetween.

Figures 6A, 6B:
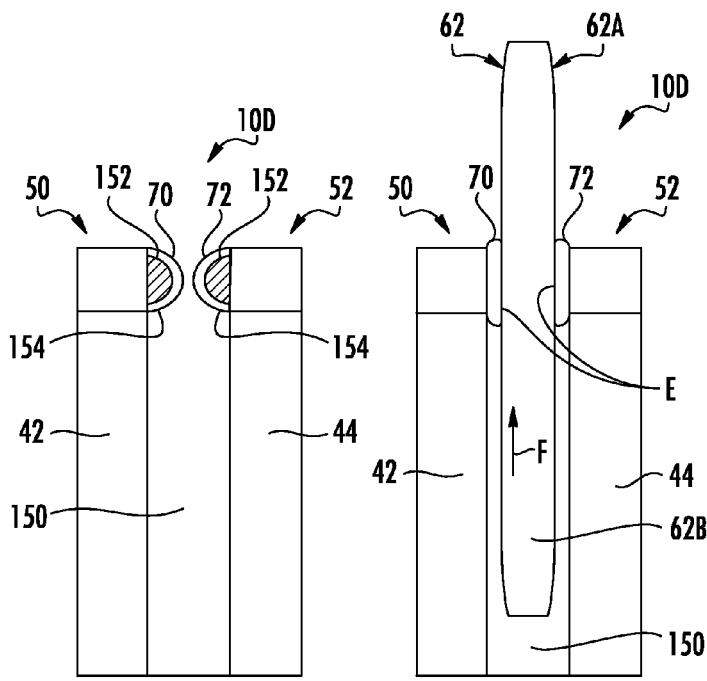
FIG. 6A is a cross-sectional view of an item holder in an at-rest position.
FIG. 6B is a cross-sectional view of the item holder of FIG. 6A retaining an item.

Referring now to FIGS. 6A and 6B, another embodiment of the item holder 10D is shown having first and second retention members 50, 52 with edge portions 70, 72 disposed thereon, wherein the first and second retention members 50, 52 are disposed along upper portions of divider walls 42, 44. As shown in FIG. 6A, the divider walls 42, 44 are spaced apart to define a storage area 150. In use, the storage area 150 is adapted to receive a portion of an item as retained between the first and second retention members 50, 52 at the edge portions 70, 72. In the embodiment shown in FIG. 6A, the retention members 50, 52 are in an at-rest position A. As further shown in FIG. 6A, the edge portions 70, 72 comprise a foam core 152 having an outer lining 154 which is made of a durable material such as cloth or leather. The outer lining is comprised of a durable material that will hold up to a high frequency of items being inserted and removed from the item holder 10D. It is further contemplated that the outer lining 154 may include a rubberized lining, or other like lining, to provide a tractioned or textured surface for better engagement of an item as stored in the item holder 10D.

Referring now to FIG. 6B, the item holder 10D is shown having a portable electronic device 62 stored therein. The portable electronic device 62 may be a phone or other such item that is positively retained by the first and second retention members 50, 52 at the edge portions 70, 72. Thus, as shown in the cross-sectional view of FIG. 6B, the first and second retention members 50, 52 are in an engaged position E about portable electronic device 62. As further shown in FIG. 6B, a lower portion 62B of the portable electronic device 62 is disposed within storage area 150 defined between divider walls 42, 44. As further shown in FIG. 6B, an upper portion 62A of the portable electronic device 62 is disposed above the item holder 10D for ready access to the vehicle occupant. The edge portions 70, 72 of the first and second retention members 50, 52 are shown in the engaged position E, and given the resiliency of the edge portions 70, 72, by the foam cores 152, the portable electronic device 62 is securely retained therebetween. The retention of the portable electronic device 62 between the first and second retention members 50, 52 is a generally friction-fit retention, such that the portable electronic device 62 can be moved in a vertical direction as indicated by arrow F while still being retained in the item holder 10D by the first and second retention members 50, 52. Thus, the item holder of the present invention is adapted to retain an item generally along a length of the item retained therein.

Figures 7A, 7B:
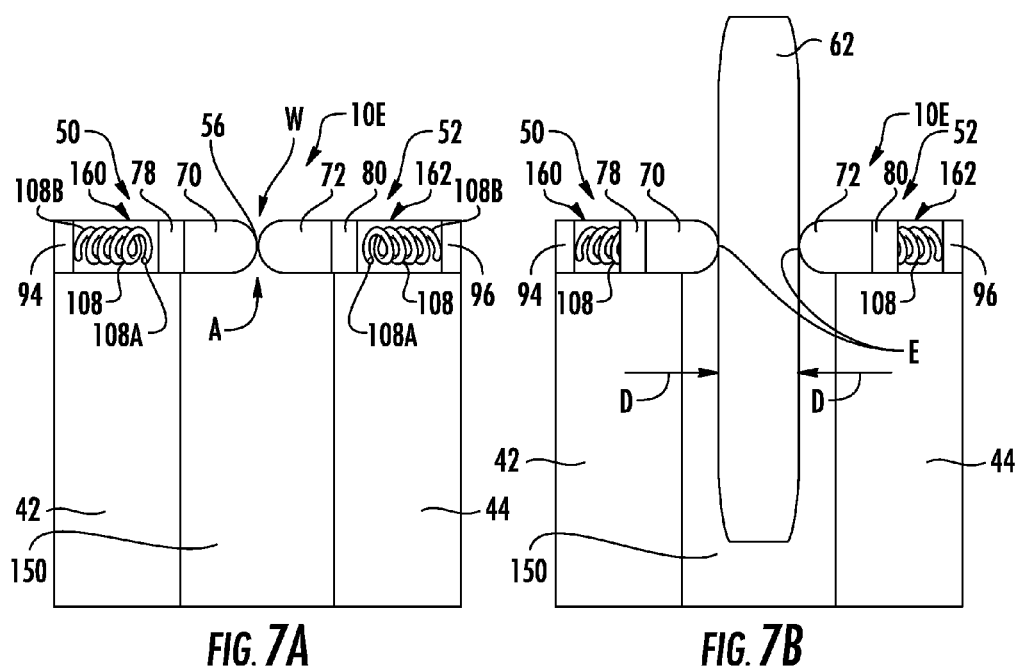
FIG. 7A is a cross-sectional view of an item holder of another embodiment in an at-rest position.
FIG. 7B is a cross-sectional view of the item holder of FIG. 7A retaining an item.

Referring now to FIG. 7A and 7B, another embodiment of the item holder 10E is shown.

The item holder 10E includes first and second retention members 50, 52 having edge portions 70, 72 which abut one another at innermost surfaces 74, 76 along abutment line 56. In this way, the storage area 150, defined between the divider walls 42, 44, is closed off from view when the item holder 10E is in an at-rest position A as shown in FIG. 7A. As further shown in FIG. 7A, biasing mechanisms 160, 162, in the form of coil springs 108, are disposed within the first and second retention members 50, 52 and generally abut outermost surfaces 78, 80 of the edge portions 70, 72 at a first end 108A, and further abut reinforcement members 94, 96 at opposite ends 108B. Thus, the first and second retention members 50, 52 are adapted to move between the abutting at-rest position A, shown in FIG. 7A, to the recessed position B by a force exerted on the edge portions 70, 72 as an item is stored in the item holder 10E. Thus, as the first and second retention members 50, 52 move to the recessed position B from the at-rest position A, the edge portions 70, 72 will part at the abutment line 56 to receive the item 62 as shown in FIG. 7B. In FIG. 7B, a portable electronic device 62, such as a mobile phone, is shown as an item stored within the item holder 10E. The first and second retention members 50, 52 are shown in a recessed position B, which can also be described as an engaged position E as item 62 is engaged and retained therebetween. In this position, the coil springs 108 are in a loaded position, thereby imparting a force along the path as indicated by arrow D on the item 62 to securely retain the item 62 within the item holder 10E. As noted above, the coil springs 108 define a biasing mechanism adapted to bias the first and second retention members 50, 52 to the at-rest position A, such that when an item, such as item 62, is received therebetween, a secure engagement of the item is achieved by the constant force D of the biasing mechanisms 160, 162 acting in concert on the item 62.

As best shown in FIGS. 5A-7B, the item holders 10A-10E generally include rounded or bullnose outermost edge portions 70, 72 that are adapted to ease the insertion of an item therebetween. The rounded configuration of the outermost surfaces of the edge portions 70, 72 provides a generally round cross section as shown in FIG. 7A. Thus, even at an abutment line, such as abutment line 56 shown in FIG. 7A, the rounded outer surfaces of edge portions 70, 72 define a wedged insertion location W for an item. This wedged insertion location W makes for a tactile locating feature for a driver or passenger as the driver or passengers attempts to place an item in the item holder.

Referring again to FIG. 1, the item holder 10 is a snug-fit and slim item holder that is fully integrated into the front console 20 of the vehicle interior 12 and has an inconspicuous low profile. The snug-fit item holder 10 can be integrated into a console lid, armrest or other interior trim location in any row of the vehicle.

The snug-fit item holder, as disclosed in the embodiments herein, is an open storage space designed for driver or passengers to wedge small items, such as phones or other small electronic devices, pens, notes, cards and the like, into the item holder opening or between the retention members. The items stay firmly in place and are easily accessibly as items retained in the item holder of the present invention are not completely enclosed in a storage bin or closed-off container. The snug-fit item holder of the present invention maintains resiliency between the retention members using either a leaf spring design, as shown in FIG. 4, or a series conventional springs lining both retention members on either sides of the opening, as shown in FIGS. 5A and 5B. Further, foam cores disposed in the edge portions of the retention members may further add to the resiliency of the item holder. The different biasing mechanism disclosed above are adapted to keep resistance on the snug-fit opening of the present invention.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An item holder for a vehicle interior, comprising:
   first and second retention members having deformable edge portions arranged in a generally parallel relationship, the edge portions operable between at-rest and recessed positions;
   a biasing mechanism biasing the edge portions to the at-rest position; and
   an opening defined between the edge portions of the first and second retention members, the opening adapted to receive an item for holding by abutment with each of the edge portions.

2. The item holder of claim 1, wherein the edge portions include an outer most surface having a rounded configuration.

3. The item holder of claim 2, wherein the biasing mechanism comprises a leaf spring disposed in each of the first and second retention members.

4. The item holder of claim 2, wherein the biasing mechanism comprises one or more coil springs disposed in each of the first and second retention members.

5. The item holder of claim 4, wherein the one or more coil springs have first and second ends, the first end abutting an outermost reinforcement member of the edge portion, and the second end abutting an innermost reinforcement member of the edge portion.

6. The item holder of claim 4, wherein the one or more coil springs abut a backing member at a first end, and further abut a rigid reinforcement member at an opposite end, the rigid reinforcement member disposed along a length of the first and second retention members and operably coupled to the edge portions of the retention members.

7. The item holder of claim 1, wherein the first and second retention members are disposed along upper portions of first and second divider walls in a console assembly, the first and second divider walls defining a storage area therebetween.

8. An item holder for a vehicle interior, comprising:
   first and second retention members having edge portions arranged in a generally parallel relationship, the edge portions operable between an at-rest position, wherein the edge portions abut one another along an abutment line, and a parted position, wherein the edge portions are separated; and
   wherein the edge portions are biased towards the at-rest position for retaining an item received therebetween.

9. The item holder of claim 8, wherein the edge portions are flexibly resilient.

10. The item holder of claim 9, wherein the edge portions include a compressible foam core and an outer lining disposed about the foam core.

11. The item holder of claim 10, wherein the outer lining comprises a textured surface.

12. The item holder of claim 8, including:
   a biasing mechanism biasing the edge portions towards the at-rest position.

13. The item holder of claim 12, wherein the edge portions include an outer most surface having a rounded cross section.

14. The item holder of claim 13, wherein the biasing mechanism comprises a leaf spring disposed in each of the first and second retention members.

15. The item holder of claim 13, wherein the biasing mechanism comprises one or more coil springs disposed in each of the first and second retention members.

16. An item holder for a vehicle interior, comprising:
   a console divided into first and second storage bins by a divider, the divider having first and second divider walls defining a storage area therebetween;
   first and second retention members disposed on the first and second divider walls and operable between at-rest and recessed positions; and
   a biasing mechanism biasing the first and second retention members towards the at-rest position for retaining an item received therebetween.

17. The item holder of claim 16, wherein the first and second retention members abut one another along an abutment line in the at-rest position.

18. The item holder of claim 16, wherein the first and second retention members define a gap therebetween in the at-rest position.

19. The item holder of claim 16, wherein the first and second retention members include deformable edge portions.

20. The item holder of claim 16, wherein the biasing mechanism comprises one of a leaf spring and a plurality of coil springs disposed in each of the first and second retention members.

* * * * *